W. J. GOLIGHTLY.
GLASS GRINDING APPARATUS.
APPLICATION FILED MAY 12, 1911.

1,207,896.

Patented Dec. 12, 1916.
2 SHEETS—SHEET 1.

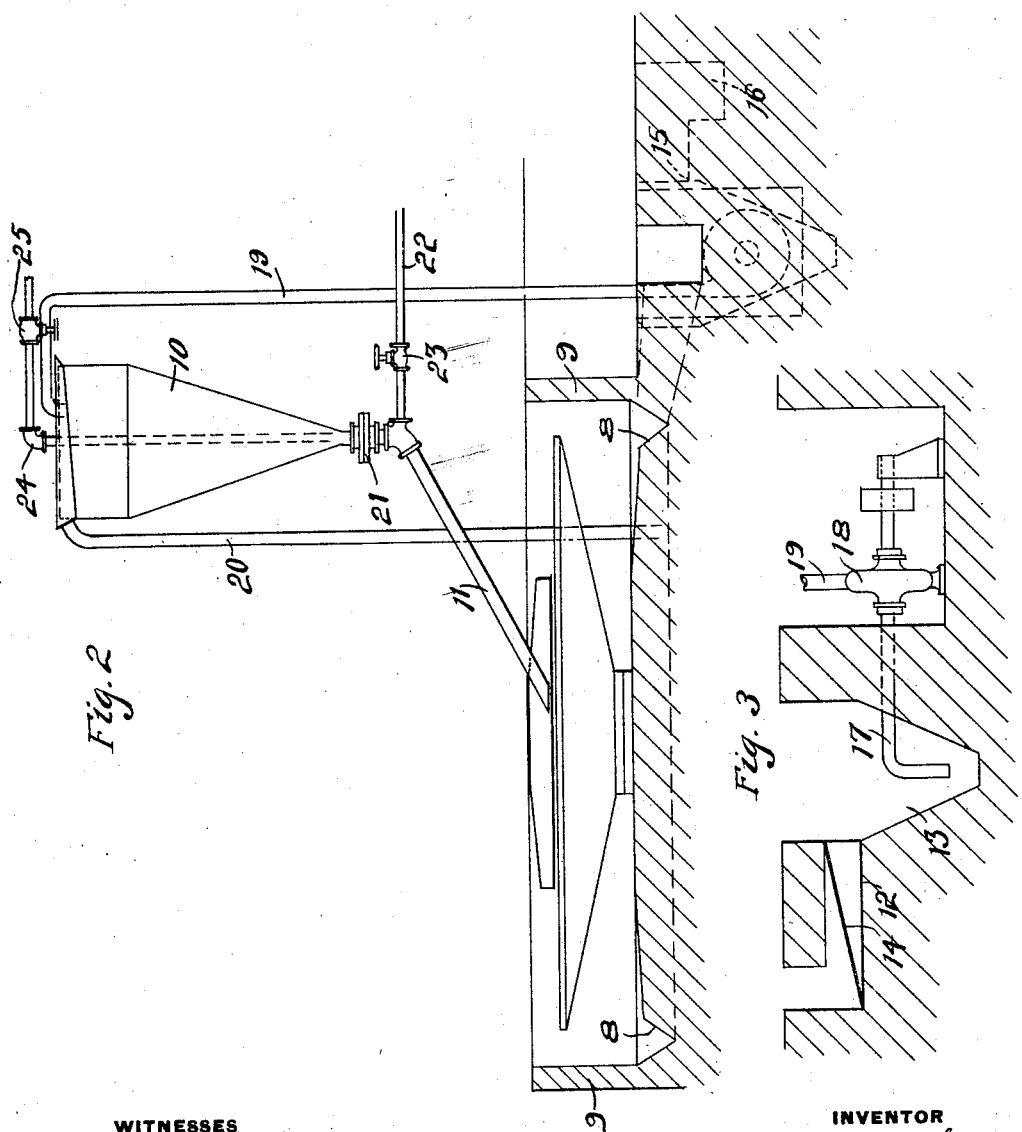

UNITED STATES PATENT OFFICE.

WILLIAM JOS. GOLIGHTLY, OF KOKOMO, INDIANA, ASSIGNOR TO PITTSBURGH PLATE GLASS COMPANY, OF PITTSBURGH, PENNSYLVANIA, A CORPORATION OF PENNSYLVANIA.

GLASS-GRINDING APPARATUS.

1,207,896.  Specification of Letters Patent.  Patented Dec. 12, 1916.

Application filed May 12, 1911. Serial No. 626,803.

*To all whom it may concern:*

Be it known that I, WILLIAM J. GOLIGHTLY, a citizen of the United States, residing in the city of Kokomo, in the county of Howard and State of Indiana, have invented certain new and useful Improvements in Glass-Grinding Apparatus, of which the following is a specification.

My invention has reference to glass grinding apparatus and particularly to apparatus for the application of grinding abrasive to glass grinding mechanism. One of the objects of my invention is to lessen the cost of grinding plate glass or other plane surfaces, by providing a simple and effective arrangement of apparatus, whereby unused portions of abrasive may be recovered and reused, either alone or in combination with a fresh supply of abrasive. Another object of my invention is the provision of means whereby a portion of the water used in grinding operations may be recovered for reuse. My invention is intended to provide an improved apparatus, whereby unused abrasive may be separated from the used portions and can be promptly re-applied to the grinding mechanism and in the provision of means whereby such recovered abrasive may be applied either alone or in combination with new abrasive and in the proper condition for the particular quality of work being done. These, together with such other objects as may hereinafter appear, or are incidental to my invention, I attain by a construction illustrated in preferred form in the accompanying drawings, wherein:—

Figure 2 is a side-elevation in section of Figure 1.

Figure 3 is the sectional view on the line III—III of Figure 1, and shows a detail of my improved apparatus.

Figure 1:
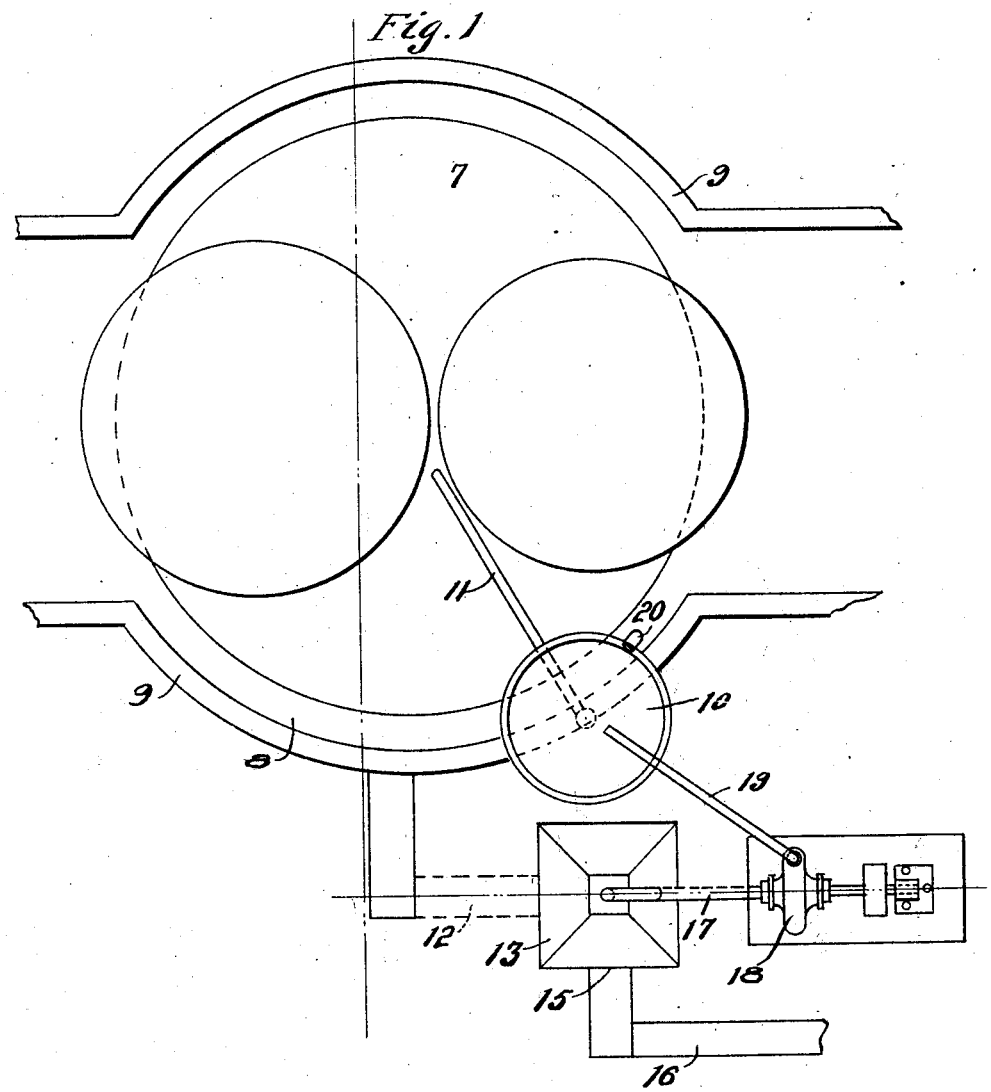
Figure 1 is a diagrammatic plan view of a grinding apparatus provided with my improved apparatus for applying the abrasive thereto.

It has been found in applying grinding abrasive to grinding mechanism, particularly glass grinding mechanism, that there is considerable waste of water and expense for maintenance, and it is one of the objects of my invention to provide apparatus which will overcome these objections, and at the same time be effectual in operation.

Referring to the drawings, it will be noted that I have diagrammatically illustrated a plate glass grinding mechanism 7 comprising the usual grinding table and runners and the ditch or canal 8, surrounded by the usual ring-wall 9. A supply tank or receptacle 10, preferably of hopper shape, is mounted above the grinding table, and is provided with the discharge pipe 11, which discharges on the grinding table at a point between the runners. Opening from the ditch is a trough 12 which leads to a receiving pit 13. A screen 14 of any desired perforate character is placed in the trough 12 at a point adjacent the receiving pit from which leads a canal or ditch 16 extending to a series of grading pits. This grading apparatus is not shown or described as my invention has no relation thereto. The pit 13 is preferably hopper shape, and at its lower or bottom portion is provided with an outlet pipe 17 which is connected to a pump 18, which pump may be of the centrifugal type shown in the drawings, or any other preferred type. Leading from the pump to the supply tank 10 is a pipe 19. The tank 10 is provided with an overflow pipe 20 which empties into the ditch 8 around the grinding mechanism. At the bottom of the tank 10 I have provided a valve 21 for controlling the flow of the contents into the supply pipe 11; and opening into the pipe 11 adjacent the said valve is a water supply pipe 22 controlled by the valve 23. An ejector or blow-out pipe 24 controlled by the valve 25 extends into the bottom portion of the tank.

While I have shown and described my invention applied particularly to glass grinding mechanism, yet I do not thus limit its application, as it is evident that it may be used with other grinding apparatus designed to procure a true plane surface through the use of any abradant material.

The operation of the apparatus is as follows: The initial step is the placing of fresh grinding abrasive together with such a supply of water as may be needed in the receiving pit 13, which abradant material and water is then elevated by the pump 18 through the pipe 19 to the tank 10, where it settles. When the tank is filled and the valve 21 opened, the water and abrasive discharge from the tank into the pipe 11, and thence to the grinding apparatus, the valve 23 being opened to permit water to enter the discharge pipe 11 from the pipe 22, the purpose of which is to regulate the consistency of abrasive for the particular character of the work being done. The supply of water at this point also prevents the abrasive from clogging or caking at the bend in the pipe, and serves to undermine and free any abrasive caked in the end of the tank outlet. Any excess of water in the tank 10, is carried from the tank to the ditch 8 by means of the overflow pipe 20 and flows to the pit 13 and thence into the canal 16. The centrifugal force developed by the turning of the grinding table carries the abrasive material to the edge of said table and it is deposited into the ditch 8. The sand deposited in the ditch 8 is flushed or washed out by means of water and is carried through the trough 12 to the pit 13. The purpose of the screen 14 is to arrest extraneous or injurious substances which may have fallen into the ditch 8. The blow-out pipe 24 is normally closed by the valve 25 but may be brought into action from time to time to loosen the sand in the bottom of the cone in case such sand becomes caked so as to interfere with the operation of the apparatus, such blow-out pipe taking the place of a mechanical cleaner which might otherwise be employed. Any suitable fluid may be employed for accomplishing this cleaning operation, such as steam, air or water under pressure.

In grinding operations, it is found that much of the abrasive is unused and is suitable for re-application. The portions of the abradant substance which have been used are ground into fine particles and are unfit for further use for the particular work, while the unused portions are in their natural state or condition. The coarse portions of abrasive gravitate toward the bottom of the receiving pit 13, while the lighter and finer used portions remain in suspension at the top of the tank, and are carried therefrom by the overflow passage 15 into the canal or ditch 16 which carries them into grading devices where they are sorted for other uses. The unused portion of the abrasive which collects in the bottom of the pit 13 is then repumped into the tank 10, where it settles previous to re-application to the grinding table. As needed, a fresh supply of abrasive may be placed in the pit 13 and is pumped into the tank 10 together with the unused portion of abrasive which had already been applied to the grinding mechanism and recovered.

It will thus be seen that my improved apparatus, although intermittent in operation, is practicable and economical in that the unused coarse abrasive is recovered and re-applied either alone or in combination with fresh abradant substance. The application of the abrasive and liquid is under control and may be applied in any desired consistency depending on the particular work in hand. It will also be apparent that a large portion of the water used in elevating the abrasive to the tank 10 together with such water as may be utilized in washing out the ditch 8 is conducted to the receiving pit 13, and can be reused in order to secure such a consistency of the abrasive in the pit as to enable the same to be elevated to the supply tank 10 by the pump. From this it will be obvious that my improved apparatus secures a most effective and economical grinding operation. Other advantages will occur to those familiar with the art.

Having thus described my invention and illustrated its use, what I claim as new and desire to secure by Letters Patent, is the following:—

1. In apparatus for applying abrasive to grinding mechanism, the combination of a settling tank mounted above the grinding mechanism and provided with a discharge pipe leading thereto, a receiving pit, a conduit leading from the grinding mechanism to the receiving pit, an overflow passage leading from the receiving pit, a pipe leading from the receiving pit at a point beneath the level of the overflow passage and extending to the settling tank, a pump in said pipe for elevating the contents of the receiving pit to the settling tank, and a water ejector projecting into the settling tank and adapted to wash out the contents of the settling tank.

2. In apparatus for applying abrasive to grinding mechanism, the combination of a settling tank mounted above the grinding mechanism and provided with a discharge pipe leading thereto, a receiving pit, a conduit leading from the grinding mechanism to the receiving pit, an overflow passage leading from the receiving pit, a pipe leading from the receiving pit at a point beneath the level of the overflow passage and extending to the settling tank, a pump in said pipe for elevating the contents of the receiving pit to the settling tank, a water ejector projecting into the settling tank and adapted to wash out the contents of the settling tank, a water supply pipe leading into the discharge pipe, and valves for controlling the ejector, water supply and discharge pipe.

3. In apparatus for applying abrasive to grinding mechanism, the combination of a settling tank for the abrasive mounted above the grinding mechanism and provided with a discharge pipe leading thereto, a valve for controlling said discharge pipe, a water ejector projecting into the settling tank for washing out the abrasive, a valve for controlling said ejector, a water supply pipe opening into the discharge pipe, a valve for controlling said water supply pipe, a ditch extending about the grinding mechanism, a receiving tank, a conduit leading from the ditch to the receiving tank, an overflow passage leading from the receiving pit, a pipe between the receiving pit and the settling tank, and a pump in said pipe for transferring the contents of the receiving tank to the settling tank.

4. In glass grinding apparatus, the combination with glass grinding mechanism, of a receiving tank adapted to contain abrasive material and water, an outlet from its lower end, a connection leading to the grinding mechanism, and an ejector or blow-out pipe extending downwardly through the tank and having its lower end lying in the extreme lower end of the tank at the outlet thereof.

5. In combination with grinding mechanism, a settling receptacle, means for conducting the drainage from the grinding mechanism directly to the settling receptacle and delivering it to the upper portion thereof, an overflow at the upper portion of the receptacle for eliminating the surplus water and finer abrasive from such receptacle, means for conducting the mixture of coarser abrasive and water from the lower portion of the receptacle, and a water supply conduit for diluting the said mixture of coarser abrasive and water to the consistency necessary for the grinding operation.

6. In combination with grinding mechanism, a settling receptacle, means for conducting the drainage to the settling receptacle, an overflow at the upper portion of the receptacle for eliminating the surplus water and finer abrasive from such receptacle, means for conducting the mixture of coarser abrasive and water from the lower portion of the receptacle, a water supply conduit for diluting the said mixture of coarser abrasive and water to the consistency necessary for the grinding operation, and a downwardly directed fluid supply pipe with its lower end adjacent the bottom of the receptacle.

7. In combination with grinding mechanism, a settling receptacle, means for eliminating the portion of the drainage from the grinding mechanism containing the finest abrasive, means for conducting the remaining portion of the drainage from the grinding mechanism and including the utilizable grades of abrasive contained therein to the settling receptacle and delivering it to the upper portion thereof, an overflow at the upper portion of the receptacle for eliminating the surplus water and finer solid matter from such receptacle, means for conducting the mixture of coarser abrasive and water from the lower portion of the receptacle, and a water supply conduit for diluting the said mixture of coarser abrasive and water to the consistency necessary for the grinding operation.

8. Apparatus for delivering abrasive material to a utilizing apparatus comprising a preliminary collecting and separating tank to which abrasive and water are supplied from the utilizing apparatus, and having an overflow at its upper portion for removing the finest and lightest material, a separate classifying tank, means for removing the water and coarser abrasive from the lower portion of the preliminary tank and supplying it directly to the upper portion of the classifying tank, and means for removing the abrasive and water from the classifying tank and supplying it to the utilizing apparatus.

9. Apparatus for delivering abrasive material to a utilizing apparatus comprising a preliminary collecting and separating tank to which abrasive and water are supplied from the utilizing apparatus, and having an overflow at its upper portion for removing the finest and lightest material, a separate classifying tank, means for removing the water and coarser abrasive from the lower portion of the preliminary tank and supplying all of such water and abrasive to the upper portion of the classifying tank, and means for removing the abrasive and water from the classifying tank and supplying it to the utilizing apparatus.

10. Apparatus for delivering abrasive material to a utilizing apparatus comprising a preliminary collecting and separating tank, a passage leading from the utilizing apparatus to the upper portion of the preliminary tank, an overflow at the upper portion of the preliminary tank for removing the finer material, a separate classifying tank, means for removing the water and coarser abrasive from the lower portion of the preliminary tank, and supplying it directly to the upper portion of the classifying tank, and means for removing the abrasive and water from the classifying tank and supplying it to the utilizing apparatus.

11. Apparatus for delivering abrasive material to a utilizing apparatus comprising a preliminary collecting and separating tank, a passage leading from the utilizing apparatus to the upper portion of the preliminary tank, an overflow at the upper portion of the preliminary tank for removing the finer material, a separate classifying tank, means for removing the water and coarser abrasive from the lower portion of the preliminary tank and supplying all of such water and abrasive to the upper portion of the classifying tank, and means for removing the abrasive and water from the classifying tank and supplying it to the utilizing apparatus.

In testimony whereof I have hereunto signed my name in the presence of the two subscribed witnesses.

WILLIAM JOS. GOLIGHTLY.

Witnesses:
JOHN B. DURST,
ROBT. E. MURPHY.

Copies of this patent may be obtained for five cents each, by addressing the "Commissioner of Patents, Washington, D. C."